United States Patent
Nacik et al.

(10) Patent No.: US 7,189,132 B2
(45) Date of Patent: Mar. 13, 2007

(54) AUTOMATIC UPDATING OF CELL PHONE ADDRESS BOOK BASED ON SERVICE PROVIDER ERROR CODES

(75) Inventors: Indran Nacik, Cedar Park, TX (US); Jeffrey Kenneth Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 10/733,842

(22) Filed: Dec. 11, 2003

(65) Prior Publication Data

US 2005/0130596 A1    Jun. 16, 2005

(51) Int. Cl.
*H04M 3/42* (2006.01)

(52) U.S. Cl. ............ 445/415; 445/418; 379/218; 379/356

(58) Field of Classification Search ............ 455/67.11, 455/67.7; 379/218.01, 356.01; 445/415, 445/418
See application file for complete search history.

(56) References Cited

U.S. PATENT DOCUMENTS

| | | | |
|---|---|---|---|
| 6,687,362 B1 * | 2/2004 | Lindquist et al. | 379/218.01 |
| 2003/0179866 A1 * | 9/2003 | Stillman et al. | 379/88.19 |
| 2004/0176062 A1 * | 9/2004 | Hsieh | 455/221 |

* cited by examiner

*Primary Examiner*—Lester G. Kincaid
*Assistant Examiner*—Fred A. Casca
(74) *Attorney, Agent, or Firm*—Herman Rodriguez; Dillon & Yudell LLP

(57) ABSTRACT

Telephone information stored in the wireless communication device is automatically updated when a dialed telephone number has changed. Upon receiving an error code in response to making a call, the cell phone automatically determines if the error code indicates that the dialed telephone number has changed to a new telephone number. If so, the cell phone automatically determines the new telephone number from the error code and automatically updates a phone book contained within the cell phone with the new telephone number.

20 Claims, 3 Drawing Sheets

AUTOMATIC UPDATING OF CELL PHONE ADDRESS BOOK BASED ON SERVICE PROVIDER ERROR CODES

TECHNICAL FIELD

The present invention is related in general to software and systems in a mobile wireless communication device, and in particular to automatic updating of a phone book of a mobile device based on service provider information.

BACKGROUND

Address book applications on cellular telephones (or cell phones) and other mobile wireless devices provide a simple and easy way to quickly locate and dial phone numbers and other address information. By linking to personal digital assistants (PDA), laptops and desktop computers, and other personal storage devices, cell phone phone/address books provide a valuable business relationship mechanism for maintaining a user's database of contact information. Certain applications have been developed to make entering phone numbers into a phone list or address book easier and quicker. For example, many cell phones now save a number when a call comes in to the cell phone or a number is dialed by the user. Typically, such saved phone numbers can be easily and quickly saved into an address book or other type of speed dial list accessible to the user. These types of applications have significant advantages because manual entry of phone numbers typically can be tedious and difficult on most cell phones. However, these applications cannot assist a user when a number stored within an electronic phone book needs to be edited. In most situations, address book editing must be performed manually. For example, when a person's telephone number has changed, the cell phone user has to locate the new number and manually change it in the address book.

This problem is further compounded where an "address book" style speed dial list is holding multiple contacts within the address book that have the same information stored in the cell phone or PDA. For example, an address book may contain two separate entries for two people that live at the same home, which include the same home number. Therefore, when a number contained in multiple individuals' address pages, for example, a changed home phone number, the number must be modified on the multiple pages by hand.

What is needed is a system and method for automatically modifying telephone numbers stored in a cell phone or other mobile device when those numbers have changed. It would be preferred if such a system and method could change all instances of a changed number in a mobile devices phone book.

SUMMARY OF THE INVENTION

In accordance with the present invention, improved methods, systems and articles of manufacture for updating telephone information stored in a wireless communication device are disclosed. One preferred method of the present invention comprises the steps of receiving an error code from a wireless communication system; automatically determining if the error code indicates that a designated telephone number has changed to a new telephone number, wherein the error code contains information indicating the new telephone number; automatically determining the new telephone number from the information; and automatically updating a database contained within the wireless communication device with the new telephone number.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

Figure 1:
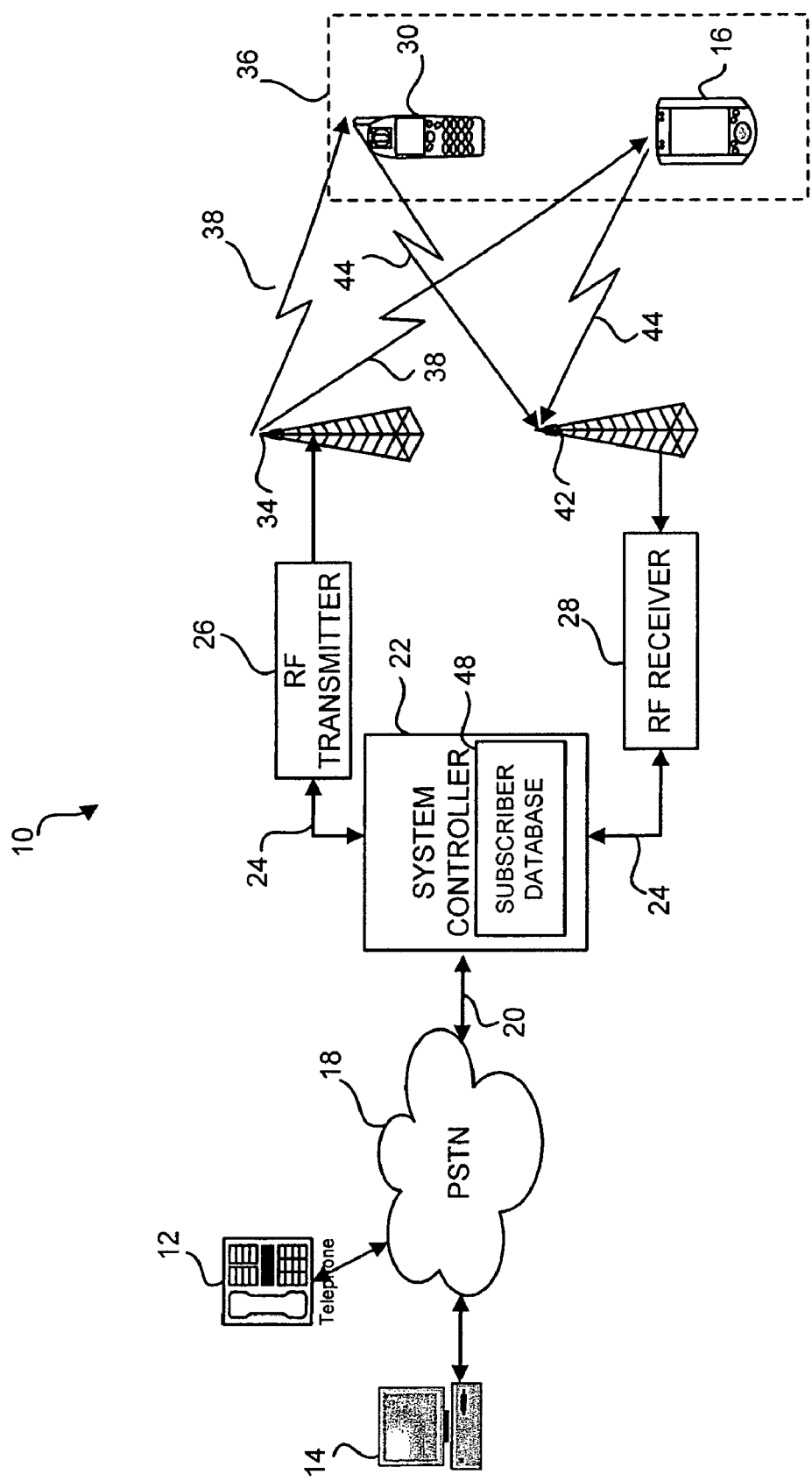
FIG. 1 depicts a data processing system network in which a preferred embodiment of the present invention may be implemented.

With reference now to the figures, and in particular with reference to FIG. 1, there is shown a block diagram of a wireless communications system in accordance with a preferred embodiment of the present invention. The wireless communication system 10 includes an input device for initiating phone calls or messages into the wireless communication system 10. The input device can be, for example, a telephone 12 or a computer 14 connected through a conventional public switched telephone network (PSTN) 18 and a plurality of telephone links 20 to a system controller 22. The telephone links 20, for example, can be a plurality of twisted wire pairs, a fiber optic cable, or a multiplexed trunk line. A telephone number is typically dialed on the PTSN using the older pulse, loop disconnect or rotary form of dialing, or the more modem Touch-Tone Dual Tone Multi-Frequency (DTMF) dialing method.

The system controller 22 is coupled to and oversees the operation of at least one radio frequency (RF) transmitter 26 and at least one radio frequency (RF) receiver 28 through one or more communication links 24. The communication links 24 typically are twisted pair telephone wires, and additionally can include radio frequency (RF), microwave, or other communication links. The radio frequency transmitter 26 and the radio frequency receiver 28 typically are used with message store and forward stations that encode and decode inbound and outbound messages into formats that are compatible with landline message switched computers and personal radio addressing requirements, such as cellular messages, short messaging service, or paging protocols. The system controller 22 can also function to encode and decode wireless messages that are transmitted to or received by the radio frequency transmitter 26 or the radio frequency receiver 28, for example, from a personal digital assistant (PDA) unit 16. Telephony signals are typically transmitted to and received from the system controller 22 by telephone sets such as the telephone 12 or a wireless communication device 30. The system controller 22 encodes and schedules outbound messages and then transmits the encoded outbound messages through the radio frequency transmitter 26 via a transmit antenna 34 to a plurality of wireless communication devices 36, such as the wireless communication device 30 on at least one outbound radio frequency (RF) channel 38. The downlink message can be, for example, a data message or a voice call. Similarly, the system controller 22 receives and decodes inbound messages such as an uplink message received by the radio frequency receiver 28 via a receive antenna 42 on at least one inbound radio frequency (RF) channel 44 from one of the plurality of wireless communication devices 36. The uplink message can be, for example, a data message, a reply to a data message, a voice call, or a reply to a voice call.

It will be appreciated by one of ordinary skill in the art that the wireless communication system 10, in accordance with the present invention, can function utilizing any wireless RF channel, for example, a one or two-way pager channel, a mobile cellular telephone channel, or a mobile radio channel. Similarly, it will be appreciated by one of ordinary skill in the art that the wireless communication system 10 can function utilizing other types of communication channels such as infrared channels. In the following description, the term "wireless communication system" refers to any of the wireless communication systems mentioned above or an equivalent.

Similarly, it will be appreciated by one of ordinary skill in the art that the wireless communication device 36 in accordance with the present invention, can be a mobile cellular telephone, a wireless personal digital assistant, a mobile radio data terminal, a mobile cellular telephone having an attached data terminal, or a two way pager, for example. In the following description, the term "wireless communication device" refers to any of the devices mentioned above or an equivalent.

Figure 2:
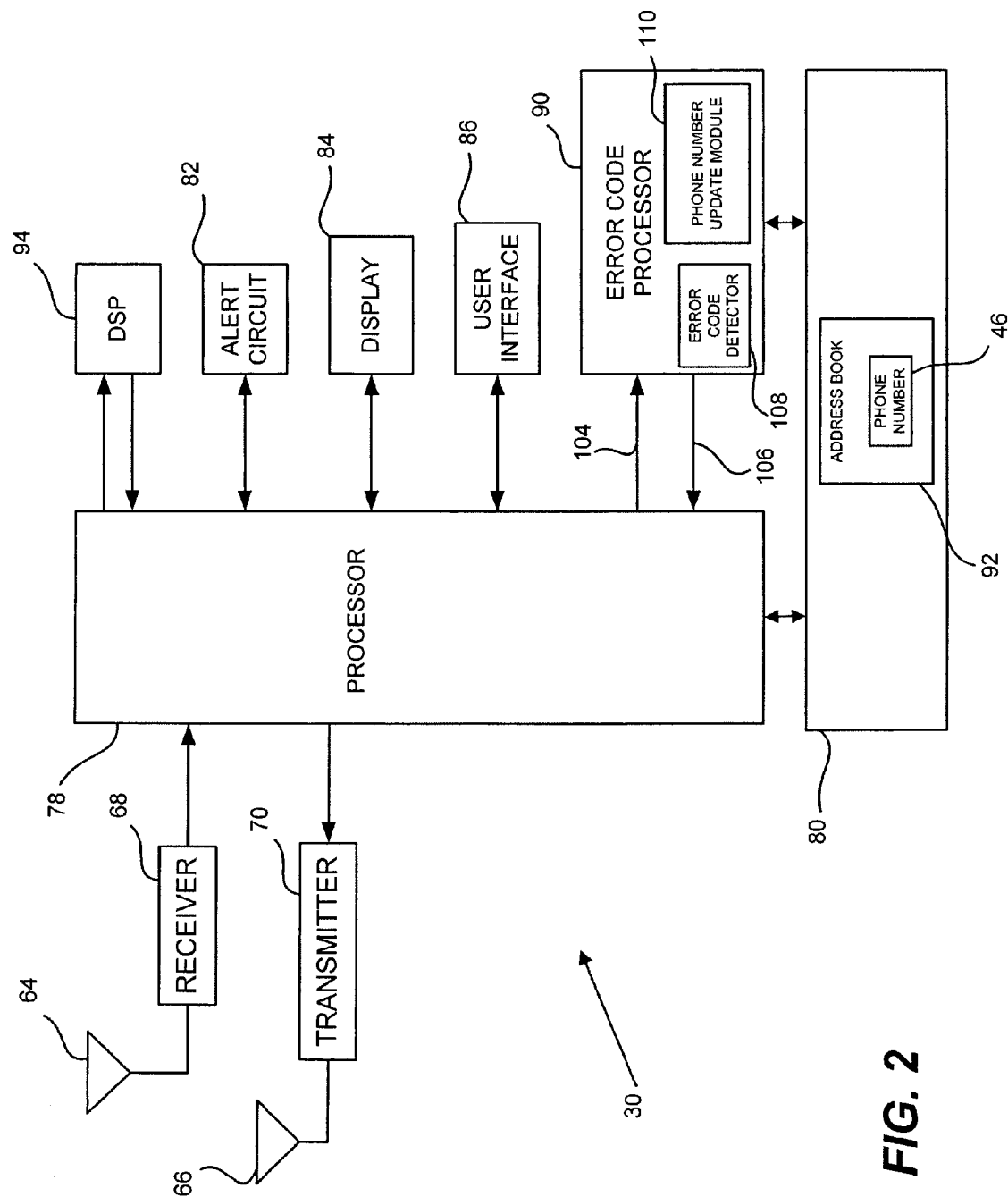
FIG. 2 is electronic block diagram of a preferred embodiment of the wireless communication device for use within the wireless communication system, as may be utilized in a preferred embodiment of the present invention.

FIG. 2 is electronic block diagram of a preferred embodiment of the wireless communication device 30 for use within the wireless communication system 10. It will be appreciated by one of ordinary skill in the art that the electronic block diagram of FIG. 2 is illustrative of each of the plurality of wireless communication devices 36 assigned for use in the wireless communication system 10. While the preferred embodiment as disclosed is implemented within a cell phone to update an address book therein, it will be appreciated by those skilled in the art that the present invention is applicable to updating of telephone numbers in a variety of wireless communication devices and personal storage devices storing and utilizing telephone numbers. It will also be appreciated that the present invention can be implemented in mobile architectures such as laptops, subnotebooks, handheld computers such as personal digital assistants and companion devices, and mobile appliances such as smart phones, pagers, simple messaging devices and wearable devices.

Referring to FIG. 2, the wireless communication device 30 includes a first antenna 64, a second antenna 66, a receiver 68, a transmitter 70, a processor 78, a memory 80, a digital signal processor (DSP) 94, an alert circuit 82, a display 84, a user interface 86, and error code processor 90. It will be appreciated by one of ordinary skill in the art that the error code processor 90 can, in the alternative, be a software program or component, a hardware circuit, an integrated part of processor 78, or any other equivalent. To perform the necessary functions of the wireless communication device 30, the processor 78 is coupled to the memory 80, which preferably includes a random access memory (RAM), a read-only memory (ROM), and an electrically erasable programmable read-only memory (EEPROM)(not shown). The memory 80 includes an address book 92 containing, for example, individual entries storing home, business and cell phone numbers for an individual or company, including a phone number 46. The memory 80 also includes an address memory, a message memory, and a location memory (all not shown).

The first antenna 64 intercepts transmitted signals from the wireless communication system 10. The first antenna 64 is coupled to the receiver 68, which employs conventional demodulation techniques for receiving the communication signals transmitted by the wireless communication system 10 of FIG. 1. Coupled to the receiver 68, is the processor 78 utilizing conventional signal-processing techniques for processing received messages. It will be appreciated by one of ordinary skill in the art that additional processors of the same or alternative type can be utilized as required to handle the processing requirements of the processor 78. The processor 78 decodes an address in the demodulated data of the received message, compares the decoded address with one or more addresses stored in an address memory of the memory 80, and when a match is detected, proceeds to process the remaining portion of the received message.

The transmitter 70 is coupled to the processor 78 and is responsive to commands from the processor 78. When the transmitter 70 receives a command from the processor 78, the transmitter 70 sends a signal via the second antenna 66 to the wireless communication system 10. The signal, for example, can be the uplink message or call. In an alternative embodiment (not shown), the wireless communication device 30 includes one antenna performing the functionality of the first antenna 64 and the second antenna 66. Further, the wireless communication device 30 alternatively includes a transceiver circuit performing the functionality of the receiver 68 and the transmitter 70. It will be appreciated by one of ordinary skill in the art that other similar electronic block diagrams of the same or alternate type can be utilized for the wireless communication device 30 to handle the requirements of the wireless communication device 30.

Upon receipt and processing of a message or call, the processor 78 preferably generates a command signal to the alert circuit 82 as a notification that the message or call is being received. The alert circuit 82 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 82. The user interface 86 can be one or more buttons used to generate a button press, a series of button presses, stylus input, a voice response from the device user, or some other similar method of manual response initiated by the device user of the wireless communication device 30.

Upon receipt of a message or call, the processor 78 preferably also generates a command signal to the display 84 to generate a visual notification of the receipt and storage of the message or call. The message or call indication, for example can be the activation of one of a plurality of message or call icons on the display 84. The display 84 can be, for example, a liquid crystal display utilized to display text. It will be appreciated by one of ordinary skill in the art that other similar displays such as dot matrix displays can be utilized for the display 84.

In a preferred embodiment, the wireless communication device 30 includes the error code processor 90. The wireless communication device 30 performs error code processing functions within the error code processor 90 using a processor command 104 sent from the processor 78. The error code processor 90 sends an application response 106 in reply to the processor command 104.

When cell phone 30 attempts to make a connection to telephone 12 or computer 14, system controller 22 will generate some service provider error code or signal representing the status of that attempt that is transmitted back to cell phone 30 during the connection process. In simple systems, a system controller 22 sends the cell phone 30 a special code, text string, audible sound or message to indicate the pending status. For example, an abstract description of the status could be verbally delivered to the cell phone user stating that the phoned receiver is busy, the connection has failed, or that a connection has been made and the system is awaiting an answer by the telephone user. As a standard in most PSTNs, when an error occurs in making a telephone connection, the user is presented with specific error messages or codes in the form of audible beeps, signals or pre-recorded messages (e.g., the fast busy signal or a "no longer in service" pre-recorded message). In accordance with a preferred embodiment of the present invention, cell phone 30 contains an error code processor 90 for performing an address book update based on such service provider error codes.

Processor 78 determines when a signal received on receiver 68 is an error code output by system controller 22 indicating an error has occurred in an attempted telephone connection. These received error codes are processed by processor 78 to produce digital representations of the error codes, which are forwarded as processor commands 104 to error code processor 90.

Within error code processor 90, error code detector 108 receives the digital signals over link 104 from processor 78 that comprise digitized representations of these received error codes. Error code detector 108 then determines the type of error code received. In one embodiment, system controller 22 transmits error codes from RF transmitter 26 over antenna 34 that are status code software objects containing structured data for reporting a particular error code. For example, a "number has changed" error object would contain code and a description indicating the error type, and would include a "new number" property that is programmatically used to update other applications that store the number to be updated. Upon receiving such an object, cell phone 30 would transfer the object from processor 78 over link 104 to error code processor 90. Error code detector 108 deciphers the error message code object to determine the type of error code. If the error code indicates a phone number has changed, error code detector 108 passes the new phone number contained within the error code object to phone number update module 110.

In response to a reply command 106 from error code processor 90, processor 78 transfers to error code processor 90 over link 104 the dialed phone number (for example, which had been entered at user interface 86 or through an automated process from memory 80) of the attempted call that resulted in the error code being transmitted. Phone number update module 110 accesses address book 92 within memory 80 and searches for the dialed phone number. This old phone number is found at memory location 46, and potentially at other memory locations within address book 92. Phone number update module 110 replaces all instances of the old phone number with the new phone number within address book 92.

When processor 78 receives a signal from transmitter 70 indicating an error code by a audible signal, processor 78 passes the received signal to digital signal processor (DSP) 94, which processes audible signals to determine the digital equivalent of the error code. In alternative embodiments, the audible signal is a pre-recorded audio message or a DTMF code(s). DSP 94 receives the analog signal corresponding to the verbal message or series of key tones provided by system controller 22 and performs an algorithm for performing voice or DTMF recognition to determine the digital equivalent of the analog signal. This signal is then is then transferred to error code detector 108 from DSP 94 via processor 78 as a processor command 104, where it determines what type of error message was presented to cell phone 30 in response to the attempted telephone connection.

In an embodiment where the new phone number is provided as an audio message to the phone user, upon error code detector determining that the error code was a "number change" error, DSP 94 would further receive the spoken new number that would have been captured by processor 78 and stored in memory 80 to perform a conversion of the audio message to a digital equivalent of the new phone number. For example, when a new phone number is provided verbally by the phone system (e.g., "the number you have dialed has changed; the new number is 555-555-5555"). This detected new phone number is then transferred to phone number update module 110 from DSP 94 via processor 78 as a processor command 104.

In an alternative embodiment, system controller 22 would transmit both a verbal message and a audio message that comprises the error code/message provided to the cell phone user. Processor 78 would only pass the DTMF portion of the error message to DSP 94 for conversion to a digital equivalent that is then passed over link 104 to error code detector 108. Error code detector 108 determines if the particular frequency and amplitude pattern of the audible error signal matches an error code indicating that a phone number dialed has been changed.

Figure 3:
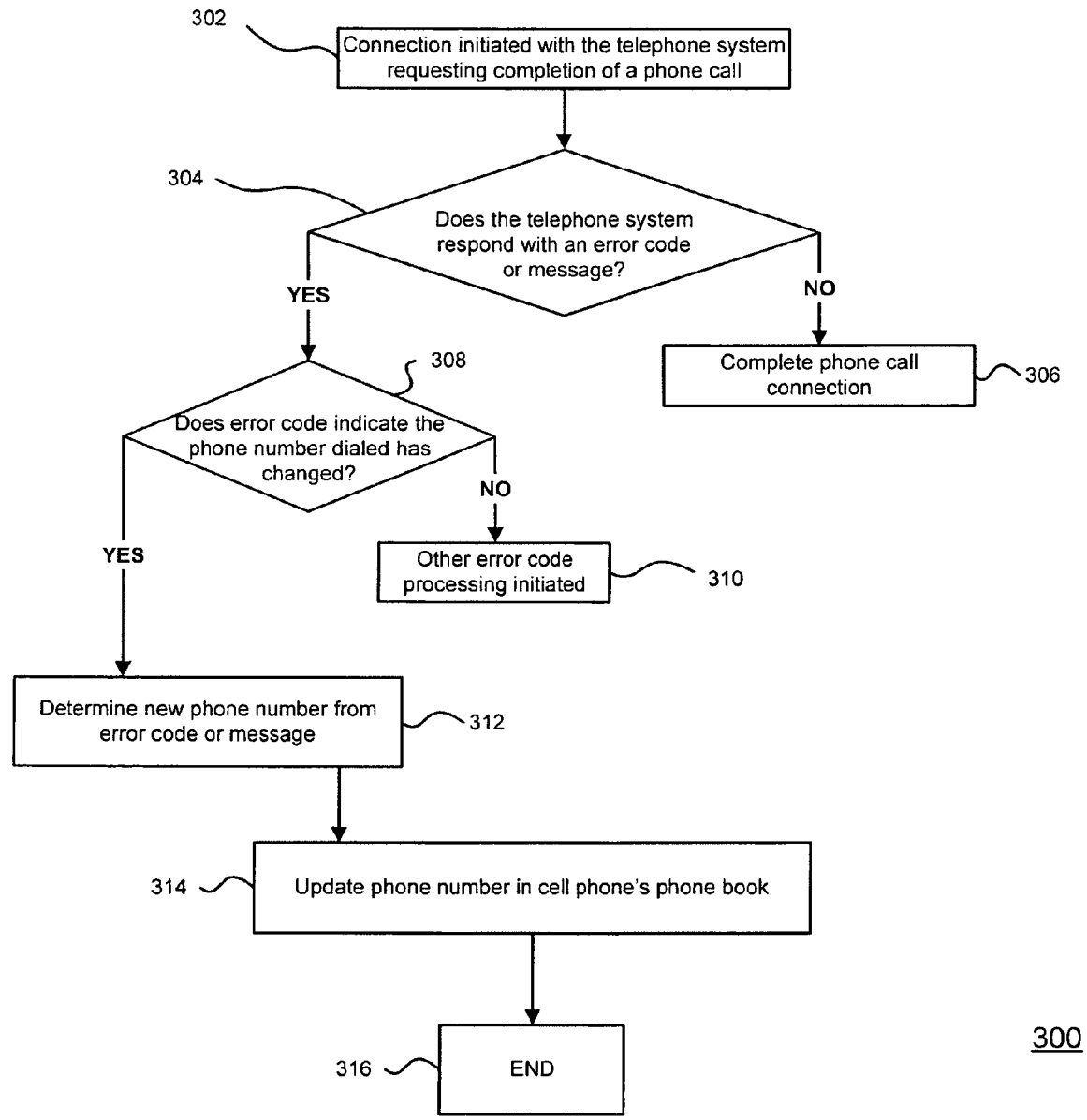
FIG. 3 shows a flow diagram of a process for updating an address book on a cell phone based on service provider error codes, in accordance with the preferred embodiment of the present invention.

With reference now to FIG. 3, there is shown a flow diagram of a process for updating an address book on a cell phone based on service provider error codes, in accordance with the preferred embodiment of the present invention. Process 300 begins at step 302, when a connection is initiated with a telephone system that requests a call be completed to a phone number dialed from a wireless communication system. The process proceeds to step 304, where it is determined if the telephone system responds with an error code or error message in response to the requested completion of the phone call. If no error code or message is produced from the requested phone call, the phone call connection is completed as seen at step 306.

If the telephone system responds to the request for completion of the phone call to the phone number dialed with an error code or message, the process proceeds to step 308, where a determination is made if the error code indicates that the phone number dialed has changed. If the error code is some other error code such as a busy signal or disconnected-type of error code, the process proceeds to step 310, where the cell phone will initiate error code processing for that type of error code. For example, if a "phone number has been disconnected" type of audible error message is received, the cell phone would search the phone list within the cell phone and delete all references to the disconnected phone number. If it is determined that the error code indicates the phone number dialed has changed, the process proceeds to step 312, where the new phone number is determined by either a programmatic or audible methodology.

In one embodiment, the error code received from the telephone system would include audible tones in a sequence that indicated a changed number-type of error code, and would include the touch-tones comprising the new phone number. In an alternative embodiment, the error code is configured as a software object containing a "code", "description" and "new number" properties that are programmatically accessed by the cell phone's processor to determine the new phone number. In still another alternative embodiment, an audible phone message recording that speaks the error code and new phone number is detected by voice recognition software and processing within the cell phone, in order to determine both that the phone number dialed has changed (step 308) and to determine the new phone number for the number dialed (step 312).

After determining the new phone number, the process proceeds to step 314, where the phone number originally dialed by the cell phone and causing the error is updated within the cell phone's phone book and other address books by storing the new number received along with the error code or message in place of the old number dialed (step 314). Thereafter, the process ends at step 316.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or scope of the present invention.

What is claimed is:

1. A method in a wireless communication device for updating telephone information stored in the wireless communication device, said method comprising:
    receiving an error code from a wireless communication system, wherein the error code is received in response to the wireless communication device initiating a call to a designated telephone number utilizing the wireless communication system;
    automatically determining if the error code indicates that the designated telephone number has changed to a new telephone number, wherein the error code contains information indicating the new telephone number;
    automatically determining the new telephone number from the information; and
    automatically updating each instance of the designated telephone number within a database contained within the wireless communication device with the new telephone number.

2. The method according to claim 1, wherein automatically determining if the error code indicates that the designated telephone number has changed includes detecting tonal signals within the error code transmitted by the wireless communication system.

3. The method according to claim 1, wherein automatically determining if the error code indicates that the designated telephone number has changed includes detecting a software object within the error code transmitted by the wireless communication system.

4. The method according to claim 1, wherein automatically determining the new telephone number from the information includes extracting the new telephone number from a software object within the error code.

5. The method according to claim 1, wherein automatically determining the new telephone number from the information includes performing voice recognition processing on an audio signal accompanying the error code.

6. The method according to claim 1, wherein automatically updating each instance of the designated telephone number within the database includes updating a phone book contained in the wireless communication device.

7. A wireless communication device having automatic update of telephone information stored in the wireless communication device comprising:
    means for receiving an error code from a wireless communication system, wherein the error code is received in response to the wireless communication device initiating a call to a designated telephone number utilizing the wireless communication system;
    means for automatically determining if the error code indicates that the designated telephone number has changed to a new telephone number, wherein the error code contains information indicating the new telephone number;
    means for automatically determining the new telephone number from the information; and
    means far automatically updating each instance of the designated telephone number within a database contained within the wireless communication device with the new telephone number.

8. The wireless communication device according to claim 7, wherein the means for automatically determining if the error code indicates that the designated telephone number has changed includes detecting tonal signals within the error code transmitted by the wireless communication system.

9. The wireless communication device according to claim 7, wherein the means for automatically determining if the error code indicates that the designated telephone number has changed includes detecting a software object within the error code transmitted by the wireless communication system.

10. The wireless communication device according to claim 7, wherein the means for automatically determining the new telephone number from the information includes extracting the new telephone number from a software object within the error code.

11. The wireless communication device according to claim 7, wherein the means for automatically determining the new telephone number from the information includes performing voice recognition processing on an audio signal accompanying the error code.

12. The wireless communication device according to claim 7, wherein the means for automatically updating each instance of the designated telephone number within the database includes updating a phone book contained in the wireless communication device.

13. The wireless communication device according to claim 7, wherein the wireless communication device is a cellular telephone.

14. The wireless communication device according to claim 7, wherein the wireless communication device is a wireless personal digital assistant.

15. An article of manufacture comprising machine-readable medium including program logic embedded therein that causes control circuitry in a wireless communication device for updating telephone information stored in the wireless communication device to perform a method comprising:
   receiving an error code from a wireless communication system, wherein the error code is received in response to the wireless communication device initiating a call to a designated telephone number utilizing the wireless communication system;
   automatically determining if the error code indicates that the designated telephone number has changed to a new telephone number, wherein the error code contains information indicating the new telephone number;
   automatically determining the new telephone number from the information; and
   automatically updating each instance of the designated telephone number within a database contained within the wireless communication device with the new telephone number.

16. The article of manufacture of claim 15, wherein automatically determining if the error code indicates that the designated telephone number has changed to a nor telephone number includes detecting tonal signals within the error code transmitted by the wireless communication system.

17. The article of manufacture of claim 15, wherein automatically determining if the error code indicates that the designated telephone number has changed includes detecting a software object within the error code transmitted by the wireless communication system.

18. The article of manufacture of claim 15, wherein automatically determining the new telephone number from the information includes extracting the new telephone number from a software object within the error code.

19. The article of manufacture of claim 15, wherein automatically determining the new telephone number from the information includes performing voice recognition processing on an audio signal accompanying the error code.

20. The article of manufacture of claim 15, wherein automatically updating each instance of the designated telephone number within the database includes updating a phone book contained in the wireless communication device.

* * * * *